US012759895B2

(12) United States Patent
Watanabe et al.

(10) Patent No.: US 12,759,895 B2
(45) Date of Patent: Oct. 13, 2026

(54) PRODUCTION METHOD FOR COBALT SULFATE

(71) Applicant: SUMITOMO METAL MINING CO., LTD., Tokyo (JP)

(72) Inventors: Hiroto Watanabe, Niihama (JP); Hideki Ohara, Niihama (JP); Keiji Kudou, Niihama (JP); Takashi Kaneko, Niihama (JP); Tatsuya Higaki, Niihama (JP); Natsuki Kondou, Niihama (JP); Shin-ichi Heguri, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 999 days.

(21) Appl. No.: 17/925,577

(22) PCT Filed: Jan. 6, 2022

(86) PCT No.: PCT/JP2022/000255
§ 371 (c)(1),
(2) Date: Nov. 15, 2022

(87) PCT Pub. No.: WO2022/224499
PCT Pub. Date: Oct. 27, 2022

(65) Prior Publication Data

US 2023/0183091 A1 Jun. 15, 2023

(30) Foreign Application Priority Data

Apr. 22, 2021 (JP) ................................ 2021-072806
Nov. 11, 2021 (JP) ................................ 2021-183837

(51) Int. Cl.
*C01G 51/01* (2025.01)
*C01G 51/10* (2006.01)
(Continued)

(52) U.S. Cl.
CPC ............ *C01G 51/01* (2025.01); *C01G 51/10* (2013.01); *C22B 3/32* (2021.05); *C22B 23/0461* (2013.01)

(58) Field of Classification Search
CPC .......................... B01J 20/20; B01J 20/28064; B01J 20/28066; B01J 20/282; B01J 20/3071;
(Continued)

(56) References Cited

U.S. PATENT DOCUMENTS

2007/0248514 A1* 10/2007 Cheng .................... C22B 3/404
423/139

FOREIGN PATENT DOCUMENTS

| | | | | |
|---|---|---|---|---|
| CN | 105668651 A | * | 6/2016 | ............ C01G 51/10 |
| JP | 2016014164 A | * | 1/2016 | |
| JP | 2019143223 A | * | 8/2019 | |

OTHER PUBLICATIONS

Robles et al (Solvent extraction design consideration for the Tati Activox® plant, The Journal of The Southern African Institute of Mining and Metallurgy, 2009) (Year: 2009).*
(Continued)

*Primary Examiner* — Anthony J Zimmer
*Assistant Examiner* — Logan Laclair
(74) *Attorney, Agent, or Firm* — Kratz, Quintos & Hanson, LLP

(57) ABSTRACT

Provided is a method for separating impurities and cobalt without using an electrolysis process from a cobalt chloride solution containing impurities and producing a high purity cobalt sulfate. The production method includes: a first solvent extraction step (S1) of bringing an organic solvent containing an alkyl phosphoric acid-based extractant into contact with a cobalt chloride solution containing impurities, and extracting zinc, manganese, and calcium into the organic solvent to separate to remove zinc, manganese, and
(Continued)

calcium; a copper removal step (S2) of adding a sulfurizing agent to a cobalt chloride solution and generating a precipitate of sulfide of copper to separate to remove copper; a second solvent extraction step (S3) of bringing an organic solvent containing a carboxylic acid-based extractant into contact with a cobalt chloride solution and back extracting cobalt with sulfuric acid after extracting cobalt into the organic solvent to obtain cobalt sulfate solution; and a crystallization step (S4) of the cobalt sulfate solution obtained after having undergone through the second solvent extraction step (S3). These steps are sequentially executed. Without using an electrolysis process, a high purity cobalt sulfate is directly produced by separating cobalt and impurities containing manganese.

5 Claims, 5 Drawing Sheets

(51) Int. Cl.
*C22B 3/00* (2006.01)
*C22B 3/32* (2006.01)

(58) Field of Classification Search
CPC ... B01J 20/3085; B01J 2220/40; B01D 53/02; B01D 2253/102; B01D 2253/306; B01D 2253/308; B01D 2257/70; B01D 2258/06; B01D 2253/31; B01D 2257/553; B01D 53/04; B01D 2257/556; C01B 32/342
See application file for complete search history.

(56) References Cited

OTHER PUBLICATIONS

Machine translation of JP-2019143223-A (Year: 2019).*
Machine translation of JP-2016014164-A (Year: 2016).*
Machine translation of CN-105668651-A (Year: 2016).*
Du Preez et al. (Evaluation of a versatic 10 Acid/Nicksyn™ Synergistic system for the recovery of nickel and cobalt from a typical lateritic leach liquor, The Southern African Institute of Mining and Metallurgy, 2013) (Year: 2013).*

* cited by examiner

PRODUCTION METHOD FOR COBALT SULFATE

TECHNICAL FIELD

The present invention relates to a production method for cobalt sulfate. More specifically, the present invention relates to a production method for obtaining high-purity cobalt sulfate by removing impurity elements contained in a cobalt chloride solution.

BACKGROUND ART

Cobalt is a valuable metal that is widely used in industry applications as a raw material for a magnetic material and a lithium-ion secondary battery, in addition to the application as an additional element for special alloys. Especially, in recent years, many lithium-ion secondary batteries are used as a battery for mobile devices and electric vehicles, and in accordance with this, demand for cobalt is also rapidly expanding. However, since most of cobalt is produced as a by-product of nickel smelting and copper smelting, separation from impurities such as nickel and copper is an important element technology in the production of cobalt.

For example, when cobalt is recovered as a by-product in hydrometallurgy/wet smelting of nickel, first, in order to obtain a solution containing nickel and cobalt, raw material is leached or extracted into the solution using a mineral acid, an oxidant, or the like, or is subjected to a dissolving treatment. Furthermore, nickel and cobalt contained in the obtained acidic solution are often separated and recovered by a solvent extraction method using various organic extractants by a conventionally known method. However, the obtained cobalt solution often contains various impurities derived from the treated raw material.

Therefore, it is further required to remove impurity elements such as manganese, copper, zinc, calcium, and magnesium from the cobalt solution after nickel is separated and recovered by the above-described solvent extraction method.

Moreover, in order to produce a high purity cobalt product with low impurity content, it was required to commercialize cobalt by an electrolysis process, crystallization, or the like after preliminarily removing impurity elements in the cobalt solution separated and recovered from a cobalt-containing nickel solution.

As a method for removing impurity elements in the cobalt solution, there are prior arts described in Patent Documents 1 and 2.

Patent Document 1 discloses a purification method of a cobalt solution including (1) a copper removal step of adding a sulfurizing agent into the cobalt solution and adjusting a redox potential (ORP) (based on Ag/AgCl electrodes) to 50 mV or less and a pH to 0.3 to 2.4 to obtain a copper sulfide precipitate and a copper-removed purified liquid, (2) a manganese removal step of adding an oxidant and a neutralizer into the copper-removed purified liquid and adjusting the redox potential (based on the Ag/AgCl electrodes) to 950 mV to 1050 mV and the pH to 2.4 to 3.0 to obtain a manganese precipitate and a manganese-removed purified liquid, (3) a solvent extraction step of using an alkyl phosphoric acid as an extractant into the manganese-removed purified liquid to extract and separate zinc, calcium, and trace impurities in the manganese-removed purified liquid.

Patent Document 2 discloses a technique in which a cobalt chloride solution having a hydrochloric acid concentration of 2 to 6 mol/L is brought into contact with an anion-exchange resin, and metallic impurities such as iron, zinc, and tin that form a complex having a distribution coefficient for an anion-exchange resin larger than that of a cobalt chloride complex are adsorbed and separated.

The solvent extraction method using the alkyl phosphoric acid as the extractant, which is disclosed in Patent Document 1 described above, has high separation performance with respect to zinc and calcium. However, in a case of the cobalt chloride solution having a hydrochloric acid concentration of 2 to 6 mol/L, an ion exchange method by the anion-exchange resin and the solvent extraction method by an amine-based extractant has the separation performance for zinc and cobalt higher compared to that of the solvent extraction method using the above-described alkyl phosphoric acid.

When a very trace amount of zinc in the cobalt chloride solution is removed, the ion exchange method is more efficient and economical because the process and the operation are simpler.

From this point of view, as a method to remove the impurity elements from the cobalt chloride solution containing manganese, copper, zinc, a method combining the purification method of Patent Document 1 described above and the separation technique of Patent Document 2 described above has been proposed (for example, Patent Document 3).

A high purity cobalt chloride production method disclosed in the paragraph 0022 of Patent Document 3 includes a solvent extraction step of separating nickel and cobalt, a manganese removal step of removing manganese, a copper removal step of removing copper, a dezincification step of removing zinc, and an electrolysis step. In the dezincification step, zinc is adsorbed and removed by bringing the cobalt chloride aqueous solution obtained in the copper removal step into contact with an anion-exchange resin. In the electrolysis process, metallic cobalt (also referred to as electric cobalt) is produced by using the high purity cobalt chloride aqueous solution obtained in the dezincification step as an electrolyte supplying liquid.

On the other hand, as described above, in recent years, demand for cobalt is expanding as a raw material of lithium ion secondary battery, and a form of the cobalt sulfate solution or cobalt sulfate crystal is desired.

When it is attempted to obtain cobalt sulfate crystal from the metallic cobalt obtained by the prior art of Patent Document 3, the cobalt sulfate crystal can be obtained by dissolving the metallic cobalt with sulfuric acid to obtain the cobalt sulfate solution and then crystallizing the solution. However, using this production method increases production cost due to an increased number of processes and increased cost for an agent. Plate-shaped metallic cobalt has a low dissolution rate in sulfuric acid as used in corrosion-resistant alloy, and thus, to dissolve it in a short time, it is required to powder the plate-shaped metallic cobalt by atomization treatment or the like.

Thus, a method of directly obtaining cobalt sulfate solution from a cobalt chloride solution without undergoing through metallic cobalt has been desired.

CITATION LIST

Patent Literature

Patent Document 1: JP-A-2004-285368
Patent Document 2: JP-A-2001-020021
Patent Document 3: JP-A-2020-19664

SUMMARY OF INVENTION

Technical Problem

The present invention has been proposed in consideration of the above-described circumstances, and it is an object of the present invention to provide a method for separating impurities and cobalt without using an electrolysis process from a cobalt chloride solution containing impurities and producing a high purity cobalt sulfate.

Solution to Problem

A production method for cobalt sulfate in a first invention includes: a first solvent extraction step of bringing an organic solvent containing an alkyl phosphoric acid-based extractant into contact with a cobalt chloride solution containing one or more impurities of copper, zinc, manganese, calcium, and magnesium, and extracting zinc, manganese, and calcium into the organic solvent to separate to remove zinc, manganese, and calcium; a copper removal step of adding a sulfurizing agent to a cobalt chloride solution having undergone through the first solvent extraction step and generating a precipitate of sulfide of copper to separate to remove copper; and a second solvent extraction step of bringing an organic solvent containing a carboxylic acid-based extractant into contact with a cobalt chloride solution having undergone through the copper removal step and back extracting cobalt with sulfuric acid after extracting cobalt into the organic solvent to obtain cobalt sulfate solution. These steps are sequentially executed.

In the production method for the cobalt sulfate of a second invention, in the first invention, in the first solvent extraction step, the alkyl phosphoric acid-based extractant is bis (2-ethylhexyl) hydrogen phosphate, and the cobalt chloride solution is adjusted to have a pH of 1.5 to 3.0 and is subjected to solvent extraction using the extractant, and impurity elements are extracted into the organic solvent.

In the production method for the cobalt sulfate of a third invention, in the first invention or the second invention, in the copper removal step, an oxidant and a neutralizer are added to the cobalt chloride solution where the sulfurizing agent is added to adjust a redox potential to −100 mV to 200 mV (based on an Ag/AgCl electrodes) and the pH to 1.3 to 3.0.

In the production method for the cobalt sulfate of a fourth invention, in the first invention, the second invention, or the third invention, in the second solvent extraction step, a cobalt extraction step of adding an alkaline solution to the cobalt chloride solution where copper, zinc, manganese, and calcium are removed to adjust the pH to 5.0 to 7.0 and extracting cobalt into an organic solvent using a carboxylic acid-based extractant is executed.

In the production method for the cobalt sulfate of a fifth invention, in the first invention, the second invention, or the third invention, includes following to the cobalt extraction step in the second solvent extraction step, a cobalt back extraction step of bringing a sulfuric acid solution into contact with the organic solvent where cobalt has been extracted to adjust the pH to 2.0 to 4.5, and back-extracting cobalt to the sulfuric acid solution is executed.

In the production method for the cobalt sulfate of a sixth invention, in the first invention, the cobalt sulfate solution obtained after having undergone through the second solvent extraction step is subjected to a crystallization step to obtain crystals of the cobalt sulfate.

In the production method for the cobalt sulfate of a seventh invention, in the first invention, the second invention, the third invention, the fourth invention, the fifth invention, or the sixth invention, the second solvent extraction step includes a solvent recovery treatment, and the solvent recovery treatment is a treatment of bringing the cobalt chloride solution after cobalt has been extracted into contact with an organic solvent after cobalt has been back-extracted into the sulfuric acid solution to adjust the pH to 2.0 or more and 4.0 or less, so as to separate the carboxylic acid-based extractant in the cobalt chloride solution.

Advantageous Effects of Invention

According to the first invention, a high purity cobalt sulfate solution where impurities are removed from a cobalt chloride solution containing the impurities can be obtained by a first solvent extraction step of separating and removing zinc, manganese, and calcium, a copper removal step of precipitating sulfide of copper, and a second solvent extraction step of separating and removing magnesium. Accordingly, a high purity cobalt sulfate can be directly produced by separating impurities and cobalt without using an electrolysis process.

According to the second invention, by adjusting the pH to 1.5 to 3.0, cobalt can be left in an aqueous phase and zinc, manganese, and calcium can be extracted and separated from cobalt.

According to the third invention, the sulfide of copper can be precipitated and sufficiently removed from the cobalt chloride solution, and coprecipitation of cobalt can be suppressed.

According to the fourth invention, by adjusting the pH to 5.0 to 7.0, bringing cobalt into contact with the organic solvent containing the carboxylic acid-based extractant allows extracting cobalt into the organic phase.

According to the fifth invention, by bringing cobalt extracted into the organic phase into contact with the sulfuric acid solution and adjusting the pH to 2.0 to 4.5, cobalt can be back-extracted into the sulfuric acid solution. Thus, a high purity cobalt sulfate solution can be obtained.

According to the sixth invention, by further executing the crystallization step, high purity cobalt sulfate crystals can be obtained from the cobalt sulfate solution.

According to the seventh invention, by executing the solvent recovery step of separating the carboxylic acid-based extractant in the cobalt chloride solution, it is possible to suppress a loss of the organic solvent due to being contained in the cobalt chloride solution after the extraction and increase of environmental load in wastewater.

DESCRIPTION OF EMBODIMENTS

The following describes specific embodiments of the present invention in detail. Note that the present invention is not limited to the following embodiments, and various modifications can be made in a range that does not change the gist of the present invention.

Principle of the Present Invention

A production method for cobalt sulfate according to the present invention will be described based on FIG. 1.

In this production method, the following steps are sequentially executed. (1) a first solvent extraction step S1 of bringing an organic solvent containing an alkyl phosphoric acid-based extractant into contact with a cobalt chloride solution containing one or more impurities of copper, zinc, manganese, calcium, and magnesium and extracting zinc, manganese, and calcium into the organic solvent to separate to remove zinc, manganese, and calcium, (2) a copper removal step S2 of adding a sulfurizing agent to the cobalt chloride solution where zinc, manganese, and calcium are removed by the first solvent extraction step S1 and generating a precipitate of sulfide of copper to separate to remove copper, and (3) a second solvent extraction step S3 of bringing an organic solvent containing carboxylic acid into contact with the cobalt chloride solution where copper, zinc, manganese, and calcium are removed by the copper removal step S2, and, after cobalt is extracted into the organic solvent, back-extracting cobalt with sulfuric acid to obtain cobalt sulfate solution are sequentially executed. Then, it is preferable to include a solvent recovery treatment S32 in the second solvent extraction step S3.

In the present invention, a crystallization step S4 for precipitating crystals from the cobalt sulfate solution is executed as necessary after each of the steps S1 to S3.

Figure 1:
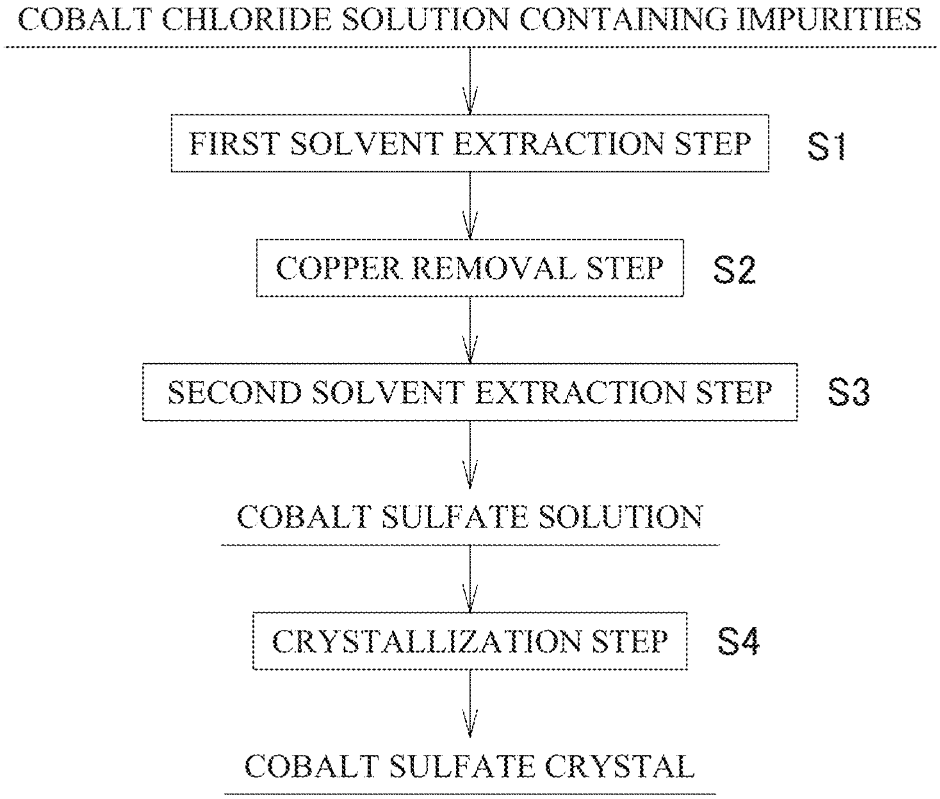
FIG. 1 is a process diagram illustrating a production method for cobalt sulfate according to the present invention.

While not illustrated in FIG. 1, after the first solvent extraction step S1 and (or) after the second solvent extraction step S3, a step of subjecting to an oil-water separator such as an activated carbon column may be added so as to separate to remove organic components mixed in the liquid.

The cobalt chloride solution as a starting material in the present invention contains one or more of copper, zinc, manganese, calcium, and magnesium as the impurity elements. While there is no limitation for applying the present invention, as long as a cobalt chloride solution contains such impurities, the present invention is preferably applied to a cobalt chloride solution after, especially in the solvent extraction step of nickel smelting, nickel is separated and recovered by an alkyl phosphoric acid-based extractant or an amine-based extractant from a nickel solution containing cobalt.

According to the present invention, a high purity cobalt sulfate solution can be obtained by separating and removing zinc, manganese, and calcium by the first solvent extraction step S1, generating a sulfide precipitate of copper to remove copper by the copper removal step S2, and separating and removing magnesium by the second solvent extraction step S3, from the cobalt chloride solution containing impurities. Accordingly, it is possible to directly produce a high purity cobalt sulfate solution by separating impurities and cobalt without using an electrolysis step. Then, a carboxylic acid-based extractant can be separated and recovered by the solvent recovery treatment S32 included in the second solvent extraction step S3.

According to the present invention, by subjecting the cobalt sulfate solution after having undergone through each of the steps S1 to S3 to the crystallization step S4, crystals can be precipitated from the solution to obtain cobalt sulfate crystals

Embodiment

Figure 2:
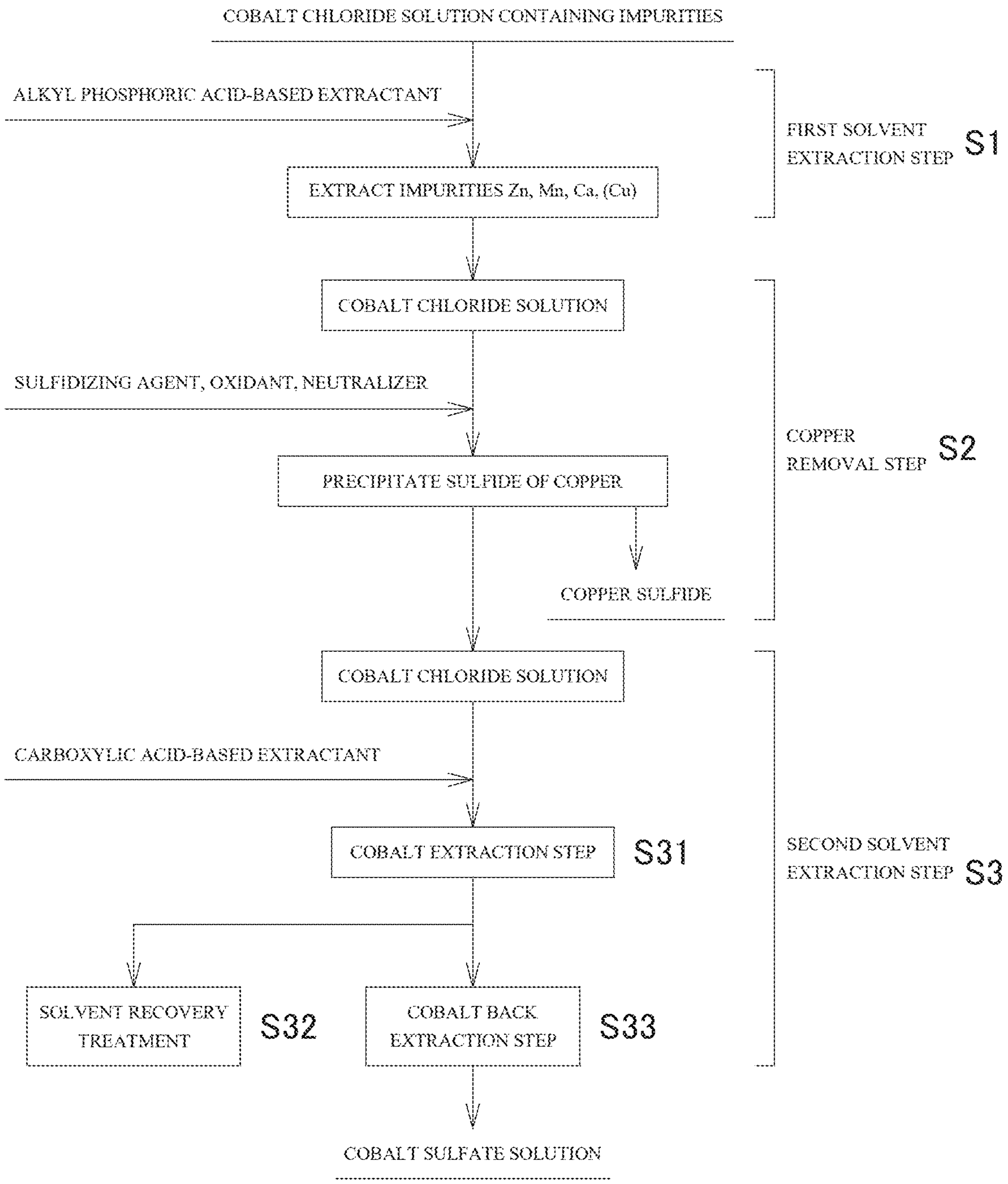
FIG. 2 is a process diagram illustrating a production method for cobalt sulfate according to one embodiment of the present invention.

The following describes the embodiments of the production method for the cobalt sulfate based on FIG. 2 to FIG. 5. FIG. 2 collectively illustrates the detail of the steps S1 to S3 illustrated in FIG. 1.

(First Solvent Extraction Step S1)

Figure 3:
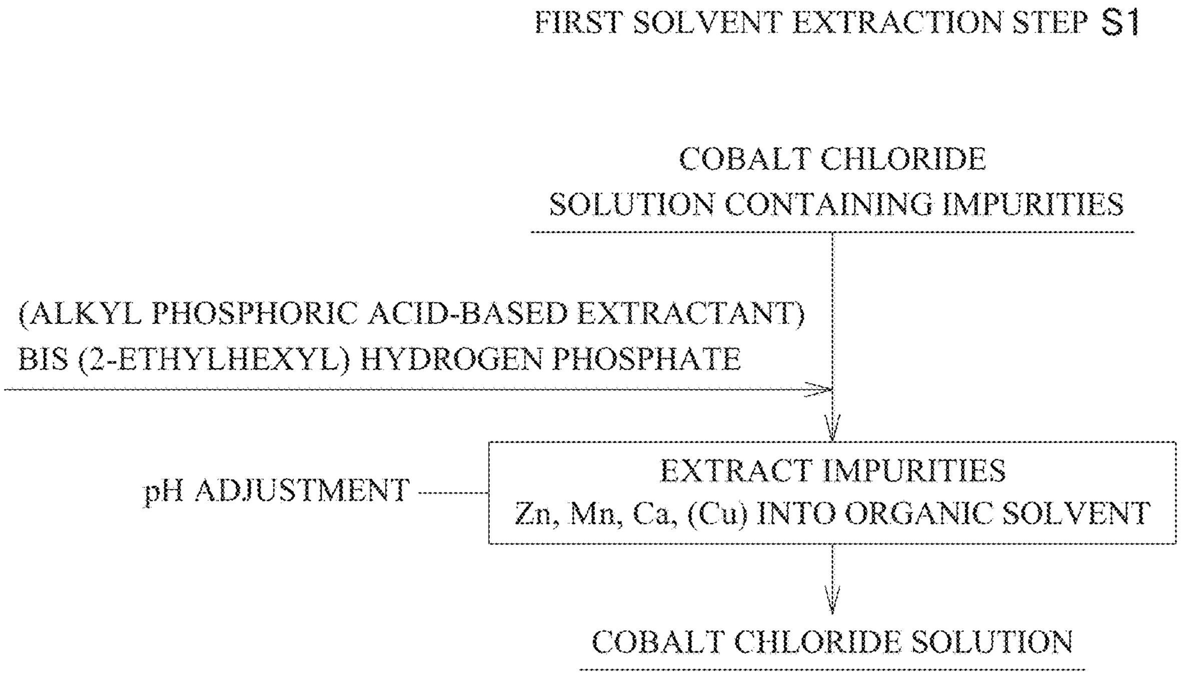
FIG. 3 is a detail process diagram of a first solvent extraction step S1 illustrated in FIG. 2.

The first solvent extraction step S1 will be described based on FIG. 2 and FIG. 3.

The first solvent extraction step S1 is a step of bringing the organic solvent containing the alkyl phosphoric acid-based extractant into contact with the cobalt chloride solution as a starting material containing one or more impurities of copper, zinc, manganese, calcium, and magnesium and extracting zinc, manganese, and calcium into this organic solvent to separate to remove zinc, manganese, and calcium. Note that a part of copper can also be extracted to be separated and removed.

As the organic solvent, an alkyl phosphoric acid-based extractant diluted with a diluent is used. The alkyl phosphoric acid-based extractant includes bis (2-ethylhexyl) hydrogen phosphate (Product name D2EHPA), 2-ethylhexyl hydrogen-2-ethylhexylphosphonate (Product name PC-88A), and Diisooctylphosphinic acid (Product name CYANEX272). Among these substances, in a case of separating zinc, manganese and calcium from the cobalt chloride solution where copper is removed, it is preferable to use bis (2-ethylhexyl) hydrogen phosphate having high separability from cobalt as an extractant.

The diluent is not particularly limited as long as it can dissolve an extractant. As the diluent, for example, a naphthene-based solvent or an aromatic-based solvent can be used. The concentration of the extractant is preferably adjusted to 10 volume % to 60 volume %, more preferably 20 volume % to 50 volume %. When the concentration of the extractant falls in this range, it is possible to sufficiently extract impurity elements having high concentration and impurity elements having low distribution ratio (element concentration in the organic substance/element concentration in the solution). On the other hand, when the concentration of the extractant is less than 10 volume %, the impurity elements having high concentration and impurity elements having low distribution ratio cannot be sufficiently extracted and are likely to remain in the cobalt chloride solution. Further, when the concentration of the extractant exceeds 60 volume %, a viscosity of the extractant becomes high, and phase separability after an extraction operation between the organic solvent (an organic phase) and the cobalt chloride solution (an aqueous phase) deteriorates.

As indicated in Formula 4, an acid extractant such as the alkyl phosphoric acid-based extractant is an extractant that extracts a metal ion by substituting —H contained in the extractant with a cation in an aqueous phase to form a metal salt. Typically, the higher the pH, the easier it is for the metal ion to be extracted into an organic phase, and when the pH is lowered, the reaction of Formula 4 proceeds in the opposite direction, and the metal ion extracted in the organic phase is easily back-extracted in the aqueous phase.

Because the extracted pH differs depending on the type of metal ion, in the solvent extraction step using an acid extractant, a target element and the impurity element are separated by controlling the pH.

$$nRH_{org}+M^{n+}_{aq}\rightarrow MR_{n\,org}+nH^{+}_{aq} \quad \text{(Formula 4)}$$

Here, RH in the Formula indicates an acid extractant, $M^{n+}$ indicated an n-valent metal ion, org indicates an organic phase, and aq indicates an aqueous phase.

Thus, in the first solvent extraction step S1, it is desirable to adjust the pH of the cobalt chloride solution to 1.5 to 3.0. In this pH region, the extraction rates of zinc, manganese, and calcium tend to be higher than the extraction rate of cobalt, and it is possible to separate cobalt by leaving cobalt in the aqueous phase and extracting these impurity elements in the organic phase.

When pH is less than 1.5, the extraction rates of these impurities are low, and it becomes difficult to separate them from cobalt. When the pH exceeds 3.0, the extraction rate of cobalt also increases and the separability from the impurities decreases. While when the pH is adjusted to 1.5 to 3.0, a part of cobalt is extracted in some cases, it is also possible to reduce a loss of cobalt by bringing the organic phase after extraction into contact with a hydrochloric acid solution having a pH lower than that at a time of extraction and back-extracting cobalt to recover.

Furthermore, when this organic phase is brought into contact with an acidic solution having a pH of 1 or less, most of the extracted metal ions can be back-extracted into the aqueous phase, and the organic phase after back-extraction can be reused.

(Copper Removal Step S2)

The copper removal step S2 will be described based on FIG. 2.

The copper removal step S2 is performed by adding a sulfurizing agent into the cobalt chloride solution having undergone through the first solvent extraction step S1. An oxidant and a neutralizer are added to adjust the redox potential of the cobalt chloride solution to −100 mV to 200 mV (based on the Ag/AgCl electrodes) and the pH to 1.3 to 3.0.

This step allows generating and separating the precipitate of the sulfide of copper from the cobalt chloride solution and obtaining the cobalt chloride solution where copper is removed.

Copper in the cobalt chloride solution is removed from the solution by forming the precipitate of copper sulfide in accordance with Formula 1, Formula 2, or Formula 3 below.

$$CuCl_2+H_2S\rightarrow CuS\downarrow+2HCl \quad \text{(Formula 1)}$$

$$CuCl_2+Na_2S\rightarrow CuS\downarrow+2NaCl \quad \text{(Formula 2)}$$

$$CuCl_2+NaHS\rightarrow CuS\downarrow+NaCl+HCl \quad \text{(Formula 3)}$$

In the copper removal step S2 described above, when the redox potential of the cobalt chloride solution is adjusted to −100 mV to 200 mV (based on the Ag/AgCl electrodes) and the pH is adjusted to 1.3 to 3.0, copper can be sufficiently removed as the sulfide and coprecipitation of cobalt can be suppressed.

When the redox potential exceeds 200 mV, the removal of copper in the solution becomes insufficient, and when the redox potential is less than −100 mV, the amount of coprecipitation of cobalt increases, which is not preferable. When the pH is less than 1.3, the removal of copper in the solution becomes insufficient, and filterability of the sulfide precipitate formed deteriorates. When the pH exceeds 3.0, the amount of coprecipitation of cobalt associated with the removal of copper increases, which is not preferable.

The redox potential can be adjusted by adjusting an addition amount of the sulfurizing agent. While the sulfurizing agent is not particularly limited, hydrogen sulfide gas, crystals, aqueous solutions, or the like of sodium sulfide or sodium hydrosulfide can be used.

When the hydrogen sulfide or the sodium hydrosulfide is used as a sulfurizing agent, the pH is adjusted by adjusting the addition amount of the sulfurizing agent and addition of the neutralizer. While the neutralizer is not particularly limited, alkali salts such as sodium hydroxide, calcium hydroxide, sodium carbonate, and cobalt carbonate can be used. When the redox potential becomes lower than a desired value due to addition of the sulfurizing agent, it can be adjusted by adding the oxidant. For example, the redox potential can be adjusted by introducing air into the solution and stirring it or adding a hydrogen peroxide solution.

(Second Solvent Extraction Step S3)

The second solvent extraction step S3 will be described based on FIGS. 2, 4 and 5.

The second solvent extraction step S3 is a step of bringing the organic solvent containing the carboxylic acid-based extractant into contact with the cobalt chloride solution having undergone through the copper removal step S2 and extracting cobalt in the organic solvent (hereinafter referred to as a cobalt extraction step S31), and then simultaneously executing solvent recovery treatment S32 of separating and recovering the carboxylic acid-based extractant from the cobalt chloride solution after cobalt has been extracted and a step of back-extracting cobalt with sulfuric acid (hereinafter referred to as a cobalt back extraction step S33) to obtain the cobalt sulfate solution.

As the organic solvent, a carboxylic acid-based extractant diluted with a diluent is used. Examples of the carboxylic acid-based extractant include versatic acid and naphthenic acid. These are acid extractants having a COOH group.

When the carboxylic acid-based extractant extracts a metal ion, it releases protons corresponding to the valence of the metal into the aqueous phase, and the metal ion coordinates with carbonyl oxygen. Many carboxylic acids form dimer, trimer by hydrogen bond with one another in a nonpolar solvent. When the metal ion is extracted, the carboxylic acid that has not been acid-dissociated is coordinated so as to remove hydrated water coordinated to the metal ion, in some cases. For example, the reaction in which a hexacoordinated divalent metal ion $M^{2+}$ is extracted by a dimer carboxylic acid-based extractant $R_2H_2$ is represented by Formula 5.

$$[M(H_2O)_6]^{2+}_{aq}+3(R_2H_2)_{org}\rightarrow(MR_2\cdot 4RH)_{org}+2H^{+}_{aq}+6H_2O_{aq} \quad \text{(Formula 5)}$$

Here, in Formula 5, org indicates the organic phase, and aq indicates the aqueous phase.

(Cobalt Extraction Step S31)

In the cobalt extraction step S31, an alkaline solution is added as a neutralizer to the cobalt chloride solution where copper, zinc, manganese, and calcium are removed to adjust the pH to 5.0 to 7.0. When the pH is in this range, cobalt can be extracted into the organic phase by bringing the cobalt chloride solution into contact with the organic solvent containing carboxylic acid-based extractant.

At this time, magnesium is not extracted and remains in the aqueous phase. When the pH is less than 5, it is difficult to extract cobalt, on the other hand, when the pH exceeds 7, solubility of cobalt decreases and precipitation is formed in some cases.

Specifically, a solution of sodium hydroxide or potassium hydroxide can be used as the alkaline solution.

In order to suppress oxidation during extraction, bubbling may be performed by using an inert gas such as nitrogen gas, argon gas, or carbon dioxide gas.

(Solvent Recovery Treatment S32 and Cobalt Back-Extraction Step S33)

As illustrated in FIG. 2, the solvent recovery treatment S32 and the cobalt back extraction step S33 are concurrently performed after the cobalt extraction step S31.

(Solvent Recovery Treatment S32)

Figure 4:
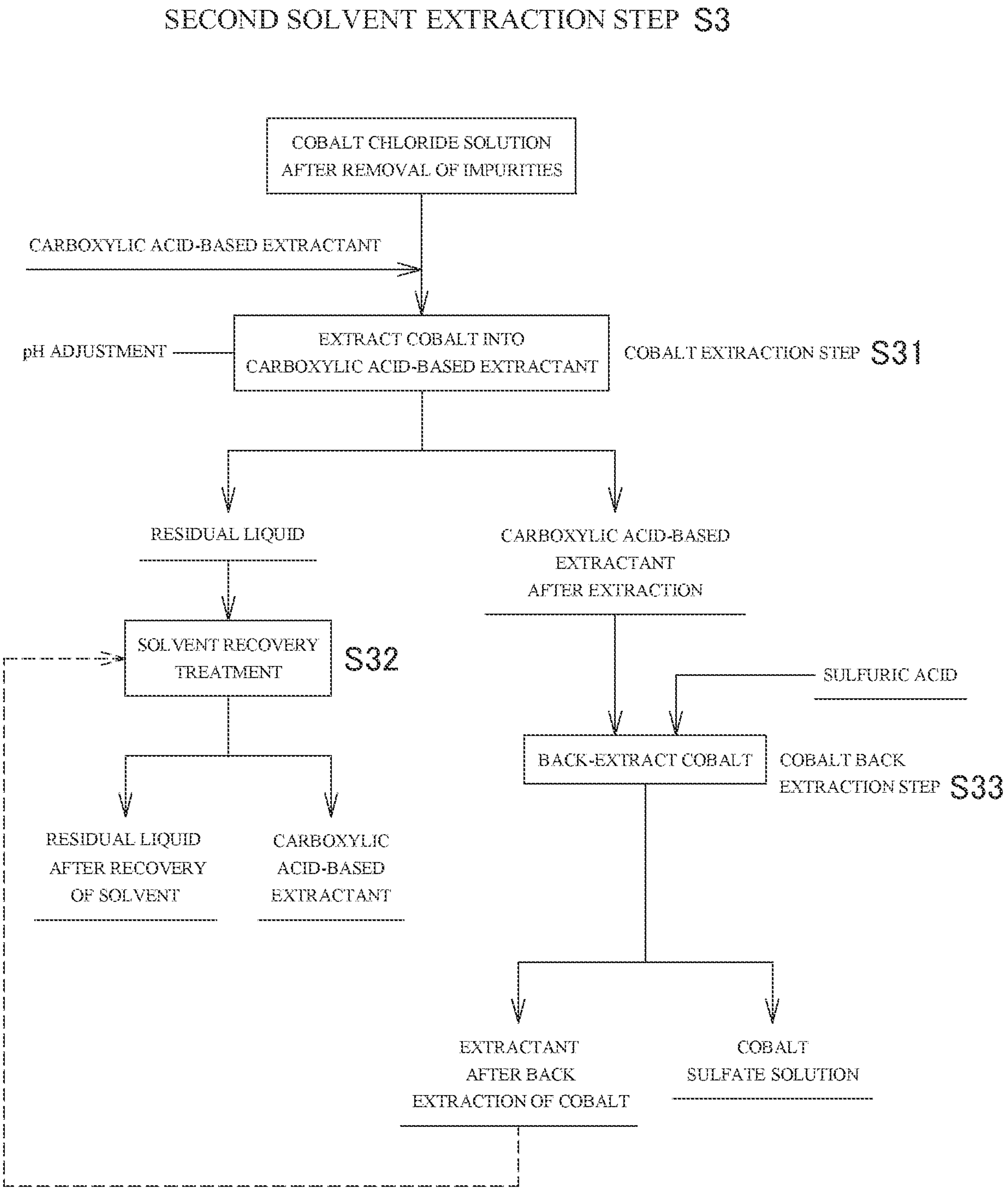
FIG. 4 is a detail process diagram of a second solvent extraction step S3 illustrated in FIG. 2.

A part of the carboxylic acid-based extractant is dissolved in the cobalt chloride solution (the aqueous phase) that is a residual liquid after cobalt is extracted in the cobalt extraction step S31 indicated in FIG. 4, in some cases. This causes a loss of the extractant, and when the aqueous phase is subjected to wastewater treatment and discharged into a sea area or the like, TOC (total organic carbon) caused by the extractant also affects the environment or the like, which is not preferable. For this purpose, it is advisable to perform the solvent recovery treatment S32 for separating and recovering the carboxylic acid-based extractant.

Figure 5:
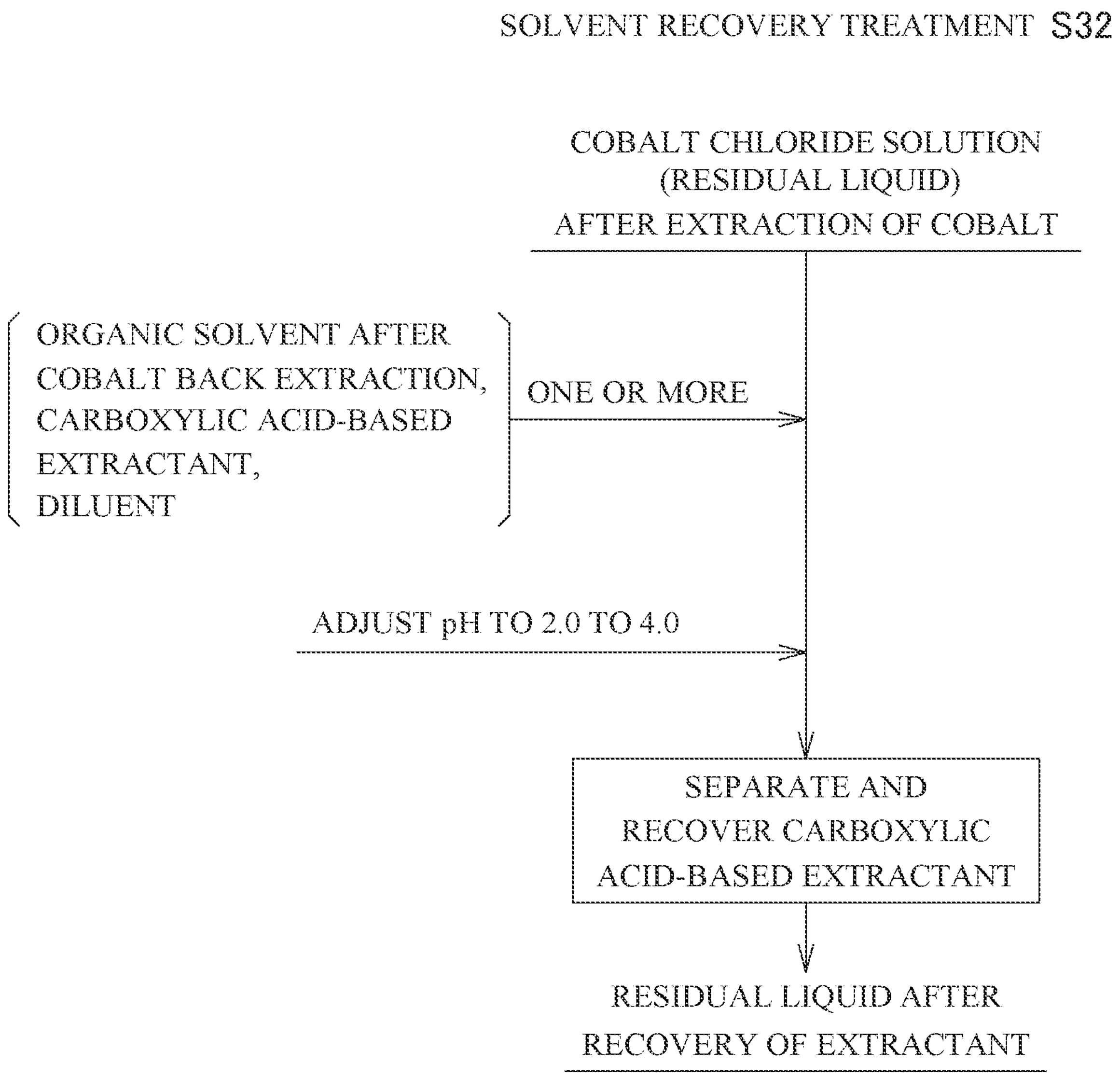
FIG. 5 is a detail process diagram of a solvent recovery treatment S32.

As illustrated in FIG. 5, the solvent recovery treatment S32 is a treatment of bringing any one or more of the organic solvent after back extraction, the carboxylic acid-based extractant, and the diluent into contact with the cobalt chloride solution (the residual liquid) after cobalt extraction and adjusting the pH to 2.0 or more and 4.0 or less by adding the neutralizer or acid to separate and recover the carboxylic acid-based extractant in the cobalt chloride solution. Then, as illustrated in FIG. 4, this solvent recovery treatment S32 is performed with respect to the residual liquid in the cobalt extraction step S31 using the organic solvent (the extractant) obtained in the cobalt back extraction step S33.

Executing this solvent recovery treatment S32 allows decreasing a loss of the organic solvent and reducing an environmental load in the wastewater (increase of TOC concentration due to dissolution of the carboxylic acid-based extractant into the aqueous phase).

(Cobalt Back Extraction Step S33)

As illustrated in FIG. 4, in the cobalt back extraction step S33, cobalt extracted into the carboxylic acid-based extractant obtained in the cobalt extraction step S31 is brought into contact with a sulfuric acid solution and the pH is adjusted to 2.0 to 4.5. This allows back-extraction of cobalt into the sulfuric acid solution. Thus, the high purity cobalt sulfate solution can be obtained.

While back extraction is possible even when the pH is less than 2, a recovery amount does not change much even when the pH is lowered too much, and an obtainable effect is small. Meanwhile, aback extraction amount of trace impurities extracted at the low pH increases more than that of cobalt, which is not preferred. Further, there are problems such as high agent cost, and thus, it is advisable to set the pH to 2.0 or higher. On the other hand, when the pH exceeds 4.5, a back extraction rate of cobalt decreases and a recovery amount of cobalt decreases, which is not preferable.

Since a fine aqueous phase is mixed in the organic phase after extraction even after phase separation, a washing step for removing this aqueous phase may be added before back extraction. For example, cobalt sulfate solution can be used as the aqueous phase of the washing step. The organic solvent after back extraction obtained in the cobalt back extraction step S33 can be reused as an organic solvent used in the solvent recovery treatment S32.

By the above-described method, a high purity cobalt sulfate solution with few impurities can be produced.

(Crystallization Step S4)

The crystallization step S4 will be described based on FIG. 1.

In the crystallization step S4, cobalt sulfate crystals are precipitated from the cobalt sulfate solution obtained in the second solvent extraction step S3. The crystallization method is not particularly limited, and a general crystallization method can be used.

Examples of the crystallization method include a method in which cobalt sulfate solution is housed in a crystallization can and crystallized inside the crystallization can to obtain crystals. The crystallization can precipitates crystals by evaporating the water content in the cobalt sulfate solution under a predetermined pressure, and, for example, a rotatory evaporator type or a double propeller type crystallization can is used. An internal pressure is reduced by a vacuum pomp or the like, and crystallization proceeds while a flask is rotated in the rotatory evaporator or while a flask is stirred with the double propeller. Inside the crystallization can, the cobalt sulfate crystals are mixed with the cobalt sulfate solution to be slurry.

The slurry discharged from the crystallization can is solid-liquid separated into the cobalt sulfate crystals and a mother liquor by a filter, a centrifugal separator, or the like. Subsequently, the cobalt sulfate crystals are dried by a dryer to remove water content.

By the above-described method, the cobalt sulfate crystals can be produced from the cobalt sulfate solution. Obviously, since the cobalt sulfate solution is highly pure with a trace amount of impurities, the obtained cobalt sulfate crystals are also highly pure with a trace amount of impurities.

EXAMPLES

While the following describes the examples of the present invention in more detail, the present invention is not limited to the following examples.

Example 1

(First Solvent Extraction Step S1)

An organic phase diluted with a diluent (Product name Teclean N20 manufactured by JXTG Nippon Oil & Energy Corporation) was prepared such that a concentration of an alkyl phosphoric acid-based extractant (Product name D2EHPA manufactured by DAIHACHI CHEMICAL INDUSTRY Corporation) was 40 volume %. Aqueous phase of 0.9 L contained in the cobalt chloride solution having a composition indicated in an original liquid A in Table 1 and 1.8 L of organic phase were mixed, and a sodium hydroxide solution was added to adjust the pH to 1.7, and then impurities were extracted. The same extraction operation was repeated with 0.9 L of aqueous phase after extraction and 1.8 L of new organic phase, and the extraction operations were performed three times in total. As a result, the cobalt chloride solution having a composition indicated in post-first SX B in Table 1 was obtained. The concentrations of zinc, manganese, and calcium were all 0.001 g/L or less, and these impurities were able to be separated and removed.

(Copper Removal Step S2)

After 0.9 L of cobalt chloride solution obtained in the first solvent extraction step S1 was adjusted so as to have a pH of 2.5 by adding a sodium hydroxide solution, a sodium hydrosulfide solution was added as a sulfurizing agent to adjust the redox potential to −50 mV (based on the Ag/AgCl electrodes), and the precipitate of sulfide of copper was generated. The precipitate was separated and removed by a filter, and the filtrate having a composition indicated in post-sulfurization C in Table 1 was obtained. The concentration of copper was less than 0.001 g/L. and copper was able to be separated and removed.

(Second Solvent Extraction Step S3)

An organic phase diluted with the diluent (Teclean N20) was prepared such that the concentration of the carboxylic acid-based extractant (Product name Versatic Acid 10 manufactured by Oxa Chemicals Corporation) was 30 volume %. Aqueous phase of 0.44 L contained in the cobalt chloride solution obtained in the copper removal step S2 and 1 L of organic phase were mixed, and then a sodium hydroxide solution was added such that the pH was 6.5, and cobalt was extracted into the organic phase.

0.6 L of extracted organic phase and 0.6 L of cobalt chloride solution having a cobalt concentration of 10 g/L were mixed, and the aqueous phase mixed in the organic phase after extraction was washed. Subsequently, this organic phase and 0.09 L of pure water was mixed, and then the pH was adjusted to 4 by adding sulfuric acid, and then, cobalt was back-extracted. As a result, the cobalt sulfate solution having a composition indicated in post-second SX D in Table 1 was obtained. The magnesium concentration was less than 0.001 g/L, and magnesium was able to be separated and removed.

By the above-described method, a high purity cobalt sulfate solution was obtained.

TABLE 1

| Element | Co | Cu | Zn | Mn | Ca | Mg |
|---|---|---|---|---|---|---|
| Original liquid A | 85 | 0.01 | 0.15 | 0.098 | 3.9 | 0.042 |
| Post-first SX B | 64 | 0.002 | <0.001 | <0.001 | 0.001 | 0.028 |
| Post-sulfurization C | 57 | <0.001 | <0.001 | <0.001 | 0.001 | 0.026 |
| Post-second SX D | 111 | <0.001 | <0.001 | <0.001 | <0.001 | <0.001 |

(Unit: g/L for all elements)

(Crystallization Step S4)

The cobalt sulfate solution was inserted into a rotatory evaporator and the inside was depressurized with a vacuum pump, and the water was evaporated while the temperature was maintained at 40° C. and a flask portion was rotated, and crystals of cobalt sulfate were precipitated. After solid-liquid separation, the obtained crystals of cobalt sulfate were dried by a dryer. As a result, high purity cobalt sulfate crystals indicated in Table 2 were obtained.

TABLE 2

| Element | Co | Cu | Zn | Mn | Ca | Mg |
|---|---|---|---|---|---|---|
| Concentration | 22 | <1 | <1 | <5 | <10 | <1 |

(Unit: % for Co and ppm for other elements)

Example 2

Cobalt sulfate solution was obtained by a method same as the method of Example 1 except that the redox potential was adjusted to 150 mV (based on the Ag/AgCl electrodes) in the copper removal step S2, aqueous phase of 0.44 L contained in the cobalt chloride solution that was obtained in the copper removal step S2 and was diluted with pure water two times and an organic phase were mixed in the second solvent extraction step S3, extracted organic phase of 0.6 L and 0.6 L of cobalt chloride solution having a cobalt concentration of 10 g/L were mixed, and the aqueous phase mixed in the organic phase after extraction was washed, and this organic phase and 0.08 L of pure water were mixed and sulfuric acid was added to adjust the pH to 4 to back-extract cobalt.

The composition in this case is indicated in Table 3. As indicated in post-second SX D in Table 3, a high purity cobalt sulfate solution was able to be obtained.

TABLE 3

| Element | Co | Cu | Zn | Mn | Ca | Mg |
|---|---|---|---|---|---|---|
| Original liquid A | 85 | 0.01 | 0.15 | 0.098 | 3.9 | 0.042 |
| Post-first SX B | 64 | 0.002 | <0.001 | <0.001 | 0.001 | 0.028 |
| Post-sulfurization C | 58 | <0.001 | <0.001 | <0.001 | 0.001 | 0.027 |
| Post-second SX D | 92 | <0.001 | <0.001 | <0.001 | <0.001 | <0.001 |

(Unit: g/L for all elements)

Subsequently, the crystallization was performed in a method same as the method of Example 1, and high purity cobalt sulfate crystals indicated in Table 4 were obtained.

TABLE 4

| Element | Co | Cu | Zn | Mn | Ca | Mg |
|---|---|---|---|---|---|---|
| Concentration | 22 | <1 | <1 | <5 | <10 | <1 |

(Unit: % for Co and ppm for other elements)

Example 3

Cobalt sulfate solution was obtained in a same way as Example 1 except that the solvent recovery treatment S32 was executed. In the solvent recovery treatment S32, the sulfuric acid was added to the cobalt chloride solution showing pH6.5 after cobalt was extracted in the cobalt extraction step S31, the pH was adjusted to 2 to 4, and the carboxylic acid-based extractant was separated and recovered.

Then, the TOC concentration in the cobalt chloride solution was measured using a known method. As indicated in Table 5, by decreasing the pH to 4 or less, the TOC contained at 260 mg/l was able to be reduced to a 100 mg/I level, that is, the carboxylic acid-based extractant was able to be separated from the cobalt chloride solution. As a result, it was possible to suppress the loss of the extractant and reduce the environmental load when the cobalt chloride solution after extraction was treated as wastewater and discharged into the sea area or the like.

TABLE 5

| Cobalt chloride solution | Before pH adjustment [pH 6.5] | pH = 4 | pH = 3 | pH = 2 |
|---|---|---|---|---|
| TOC [mg/l] | 260 | 106 | 98 | 98 |

From the results of Examples 1, 2, and 3 described above, it can be seen that according to the present invention, a high purity cobalt sulfate from which impurities can be sufficiently removed is obtained. It can be seen that when the solvent recovery treatment S32 is executed, it is possible to suppress the loss of the extractant and reduce the environmental load when the cobalt chloride solution after extraction is treated as wastewater and discharged into the sea area or the like.

INDUSTRIAL APPLICABILITY

The high purity cobalt sulfate crystal obtained by the present invention can be used as a raw material for a lithium ion secondary battery and can be used for various applications.

REFERENCE SIGNS LIST

S1 first solvent extraction step
S2 copper removal step
S3 second solvent extraction step
S4 crystallization step
S31 cobalt extraction step
S32 solvent recovery treatment
S33 cobalt back extraction step

The invention claimed is:

1. A production method for cobalt sulfate, comprising:

a first solvent extraction step of bringing an organic solvent containing an alkyl phosphoric acid-based extractant into contact with a cobalt chloride solution containing one or more impurities of copper, zinc, manganese, calcium, and magnesium, and extracting zinc, manganese, and calcium into the organic solvent to separate and to remove zinc, manganese, and calcium;

a copper removal step of adding a sulfurizing agent to a cobalt chloride solution having undergone the first solvent extraction step and generating a precipitate of sulfide of copper to separate to remove copper; and a second solvent extraction step to obtain cobalt sulfate solution from the cobalt chloride solution, wherein these steps are sequentially executed, and wherein the second solvent extraction step comprises:

a cobalt extraction step of adding an alkaline solution to the cobalt chloride solution where copper, zinc, manganese, and calcium are removed to adjust the pH to 5.0 to 7.0 and extracting cobalt into an organic solvent using a carboxylic acid-based extractant, followed by a cobalt back extraction step of bringing a sulfuric acid solution into contact with the organic solvent where cobalt has been extracted to adjust the pH to 2.0 to 4.5, and back-extracting cobalt to the sulfuric acid solution.

2. The production method for the cobalt sulfate according to claim 1, wherein in the first solvent extraction step, the alkyl phosphoric acid-based extractant is bis(2-ethylhexyl) hydrogen phosphate, and the cobalt chloride solution is adjusted to have a pH of 1.5 to 3.0 and is subjected to solvent extraction using the extractant, and impurity elements are extracted into the organic solvent.

3. The production method for the cobalt sulfate according to claim 1, wherein in the copper removal step, an oxidant and a neutralizer are added to the cobalt chloride solution where the sulfurizing agent is added to adjust a redox potential to −100 mV to 200 mV (based on an Ag/AgCl electrodes) and the pH to 1.3 to 3.0.

4. The production method for the cobalt sulfate according to claim 1, wherein the cobalt sulfate solution obtained after having undergone the second solvent extraction step is subjected to a crystallization step to obtain crystals of the cobalt sulfate.

5. The production method for the cobalt sulfate according to claim 1, wherein the second solvent extraction step includes a solvent recovery treatment, and the solvent recovery treatment is a treatment of bringing the cobalt chloride solution after cobalt has been extracted into contact with an organic solvent after cobalt has been back-extracted into the sulfuric acid solution to adjust the pH to 2.0 or more and 4.0 or less, so as to separate the carboxylic acid-based extractant in the cobalt chloride solution.

* * * * *